J. CAPDEVILA.
REPAIR HEEL FOR RUBBER FOOTWEAR.
APPLICATION FILED MAR. 5, 1913.
1,138,725.
Patented May 11, 1915.
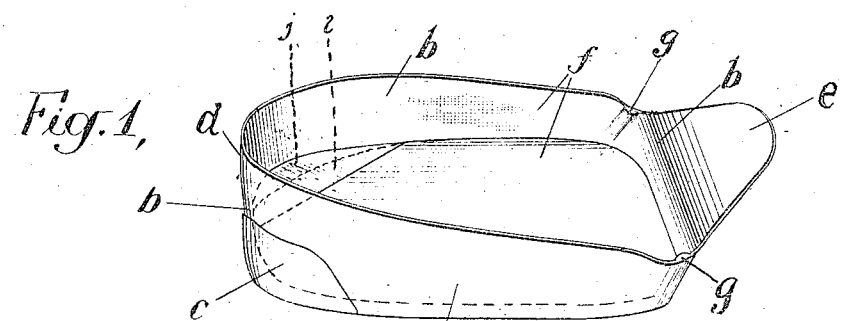
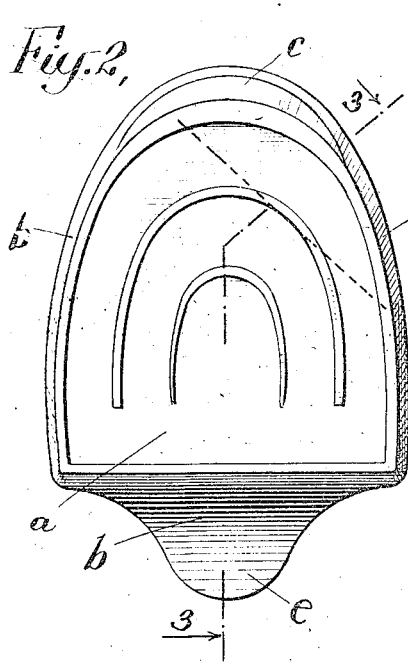
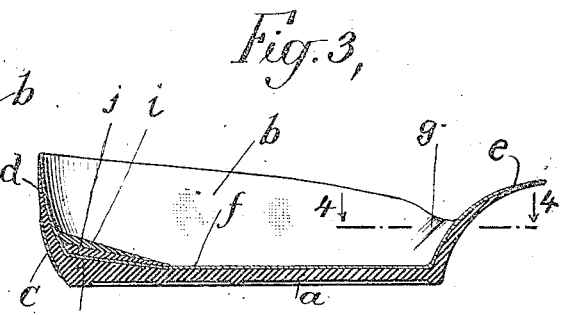
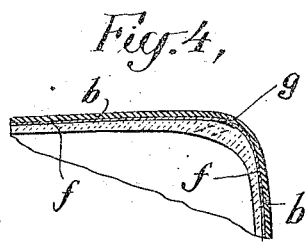
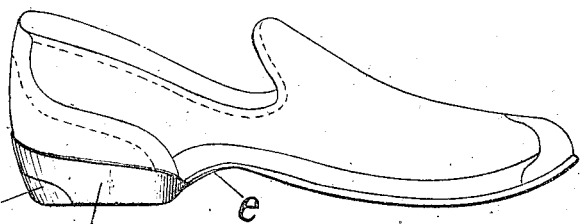
WITNESSES
Marcus P. Hopkins
M. A. Bill
INVENTOR
José Capdevila
BY
Pennie Davis & Goldsborough
ATTORNEYS

UNITED STATES PATENT OFFICE.

JOSÉ CAPDEVILA, OF NEW YORK, N. Y.

REPAIR-HEEL FOR RUBBER FOOTWEAR.

1,138,725.

Specification of Letters Patent. Patented May 11, 1915.

Application filed March 5, 1913. Serial No. 752,110.

*To all whom it may concern:*

Be it known that I, José CAPDEVILA, a subject of the King of Spain, residing in New York city, county of New York, and State of New York, and whose post-office address is No. 119 West Forty-third street, New York city, have invented certain new and useful Improvements in Repair-Heels for Rubber Footwear; and I do hereby declare the following to be a full, clear, and exact description of the invention, such as will enable others skilled in the art to which it appertains to make and use the same.

My present invention relates to a repair heel for rubber shoes, boots and the like and is especially directed to a heel designed to meet the particular requirements of shoe repairers who do not possess apparatus with which to carry out vulcanizing operations.

The invention contemplates a repair heel which is applicable to rubber footwear which has undergone various degrees of wear, by cementing alone and without employing vulcanization. Where a repair heel has been applied to a worn rubber shoe or the like by means of rubber cement or other adhesive, it has been difficult to make such an attachment of the repair heel as will withstand the wear and tear of use without becoming detached. The deforming characteristic of rubber has heretofore brought strains to bear upon the points of attachment which has caused the cemented surfaces to part and when this has occurred at one or more points the detachment of the entire repair heel quickly follows. In order to avoid as far as possible the application of the strains due to deformation of the rubber when stood upon to the points of attachment of the repair heel to the rubber shoe, I have incorporated fabric with the rubber of the repair heel which prevents in a great measure the deformation of the heel, and therefore avoids the conduction of the strains from one part to another, and I have preferably incorporated the fabric as a lining in which position it plays another important part in providing a suitable surface for the adhesive cement, as I have discovered by long observation that it is impracticable to firmly attach two rubber surfaces by the aid of cement without the employment of a vulcanizing operation.

In furtherance of the attainment of the objects in view. I have made the upper parts of the walls of my repair heel thin and have refrained from extending any reinforcements upwardly upon these walls to any considerable extent in order to avoid imparting such distortions of the lower part of the heel as invariably accompany the placing of the weight upon the heel, to the points of attachment of the walls of the heel adjacent the upper edges of the surrounding walls. I have inclined the forward wall of the heel outwardly and extended this wall to constitute an attachment flap of considerable length that it may be cemented to the arch of the sole of the rubber shoe where it is not subjected to wear and where it may present a large surface for firm attachment to resist the dragging action which is present when the heel strikes the ground with a forward motion.

As the heel of a rubber shoe wears quickly near its rear edge and as a greater or less amount of material may be missing from this rear edge of the shoe to be repaired, it is necessary to provide means for filling the space which is left by this worn part when the repair heel is attached in order that the repair heel may not crush and cause a detachment of its walls from the shoe. I have provided wedges of suitable material by the use of one or more of which the repair heel may be built up from within to avoid the occurrence of this space and preferably provide one side of each of these wedges with fabric to afford a suitable surface for cementing the wedges together, to the inner surface of the repair heel and to the surface of the shoe to which the heel is to be attached. I prefer to make a partial attachment of a sufficient number of these wedges in their proper position within the repair heel to accommodate for the maximum permissible amount of wear of the heel of the shoe to be repaired. By this partial attachment the wedges are associated with the heel in a manner to prevent their loss prior to use and in such a way that the top one or more or all may be easily detached by the repairer leaving that or those required to compensate for the wear upon the shoe to be reheeled. It is then only necessary for the repairer to cement the remaining wedges to the interior of the heel and together and cement the heel to the shoe.

I have illustrated in the accompanying drawing an embodiment of my invention,

Figure 1, being a side view in perspective of my repair heel, Fig. 2, a bottom view of same, Fig. 3, a section on line 3—3 of Fig. 2, Fig. 4, a detail section on line 4—4 of Fig. 3, and Fig. 5, a side view of a lady's rubber shoe with my repair heel attached.

Referring to the drawing, the repair heel shown comprises a bottom or tread $a$ and upstanding outwardly inclined walls $b$, the rear wall being preferably provided with a reinforcement $c$ connecting with the tread $a$ at its rear edge, which reinforcement $c$, however, should not extend to the upper edge of the rear wall but terminate at such a height upon that wall as will leave a thin attachment portion $d$ around the upper edge of this rear wall, the height of which attachment portion should be a considerable part of the height of the rear wall, preferably about half. The forward outwardly inclined wall $b$ is extended to form a thin flap $e$ which is to be cemented to the under surface of the arch of the shoe to which the heel is to be attached.

The heel is preferably molded of rubber or rubber composition. The entire inner surface of the heel and the flap $e$ is lined with fabric $f$ to which cement securely adheres. The upper portions of the walls $b$ are made thin in order that they may be easily accommodated to the surface of the shoe, but as the fabric $f$ prevents them from stretching, strains are not concentrated at any point to cause them to tear or become detached when firmly cemented to the shoe. When the flap $e$ is firmly cemented to the arch of the shoe it forms a continuation of the outwardly inclined forward wall $b$ and the pull upon the flap does not tend to distort the front wall as would be the case if said wall were vertical or inwardly inclined, but is directly transmitted through said wall to the tread $a$. I prefer to provide easily deformable ridges $g$, $g$, on the interior of the edges of the side walls $b$ to enter and fill the depression which occurs in a rubber shoe where the vamp and sole meet and in this way make the tight attachment of the heel more easy of accomplishment. I provide the wedges $h$, $i$ and $j$ to build up the interior of the heel at one side of the center of the rear edge and I may make the lower wedge $h$ integral with the tread and locate it below the lining of fabric $f$ or place it above the lining and securely attach it or make it detachable as is the case with wedges $i$ and $j$, which are each provided with a fabric on one face and are preferably secured in place by slight attachment at one edge permitting them to be either detached by tearing out or firmly attached by being lifted up, coated with cement and again pressed down.

What I claim is:—

1. A repair heel for a rubber overshoe having a rubber tread, side and rear wall portions integral therewith and extending upwardly therefrom to form a recess adapted to receive and closely embrace the worn heel of a rubber overshoe, said wall portions being constructed and arranged for cementing to the sides of said overshoe heel, and a forward wall portion integral with said tread and extending upwardly and outwardly therefrom, and a tapering flexible flap integral with said forward wall portion and extending outwardly therefrom and adapted for bending into conformity with the curve of the arch of the overshoe for cementing thereto to assist in retaining said repair heel in position and to prevent leakage of water over the forward wall between the repair heel and the tread of the overshoe; substantially as described.

2. A repair heel for rubber shoes, having outwardly inclined side, rear and forward walls and depression filling ridges instanding from said side walls adjacent said forward wall; substantially as described.

3. A repair heel for rubber shoes, having upstanding walls and a wedge detachably secured at the rear of the interior of said heel; substantially as described.

4. The combination of a repair heel for rubber footwear and a wear compensating wedge cemented within said heel; substantially as described.

5. A repair heel for rubber shoes, having upstanding walls and a plurality of wear compensating wedges partially attached in superimposed position within said heel; substantially as described.

6. A repair heel for rubber shoes, having upstanding walls, said heel being lined with fabric, and a wear compensating wedge of rubber attached in position to said fabric; substantially as described.

7. The combination with a fabric lined repair heel for rubber footwear of a wear compensating wedge having a fabric covered face; substantially as and for the purpose set forth.

8. The combination with a repair heel for rubber shoes of a plurality of wear compensating wedges detachably held in place within said heel, substantially as and for the purposes set forth.

9. A repair heel for rubber footwear, comprising a rubber body portion having thin outwardly inclined upstanding walls, the forward one of said walls being extended to form a flap, a fabric lining throughout and incorporated with said body portion and flap, and a plurality of wear compensating wedges detachably secured in place within said heel, substantially as and for the purposes set forth.

10. In combination with a repair heel having upstanding walls adapted to embrace the heel of a shoe, a lift detachably secured upon the upper side of the floor of said repair heel and constructed and arranged to compensate for irregular wear of the heel of the shoe; substantially as described.

11. In combination with a repair heel having upstanding walls adapted to embrace the heel of a shoe, a plurality of lifts detachably secured upon the upper side of the floor of said repair heel and constructed and arranged to compensate for irregular wear of the heel of the shoe; substantially as described.

In testimony whereof I affix my signature, in presence of two witnesses.

JOSÉ CAPDEVILA.

Witnesses:
  SEBASTIAN CRUSET,
  MARCUS C. HOPKINS.